United States Patent
Klein

(10) Patent No.: US 8,201,479 B2
(45) Date of Patent: Jun. 19, 2012

(54) DRIVE CONVERSION MECHANISM ENABLING CONSTANTLY MESHED GEARS IN A DRIVE INPUT GEAR TRAIN

(75) Inventor: William Scott Klein, Richmond, KY (US)

(73) Assignee: Lexmark International, Inc., Lexington, KY (US)

( * ) Notice: Subject to any disclaimer, the term of this patent is extended or adjusted under 35 U.S.C. 154(b) by 492 days.

(21) Appl. No.: 12/426,443

(22) Filed: Apr. 20, 2009

(65) Prior Publication Data

US 2010/0263481 A1    Oct. 21, 2010

(51) Int. Cl.
*F16H 3/00* (2006.01)
*F16H 57/00* (2006.01)
*F16D 41/04* (2006.01)

(52) U.S. Cl. ........................ 74/810.1; 74/404; 192/48.92
(58) Field of Classification Search ................. 74/63, 84, 74/111, 112, 113, 125.5, 126, 810.1, 412 R, 74/413, 404; 192/48.92
See application file for complete search history.

(56) References Cited

U.S. PATENT DOCUMENTS

| | | | | |
|---|---|---|---|---|
| 3,026,732 A | * | 3/1962 | Corvisier | 74/18 |
| 3,207,005 A | * | 9/1965 | Geyer | 74/810.1 |
| 3,666,063 A | * | 5/1972 | Schoeman et al. | 192/21 |
| 4,357,844 A | * | 11/1982 | Welbon | 81/57.39 |
| 4,924,720 A | * | 5/1990 | Shust | 74/377 |
| 4,970,915 A | * | 11/1990 | Williams, III | 74/810.1 |
| 5,159,854 A | * | 11/1992 | Mino et al. | 74/810.1 |
| 5,531,651 A | * | 7/1996 | Yang | 475/12 |
| 7,389,712 B2 | * | 6/2008 | Himmelmann | 74/665 B |

* cited by examiner

*Primary Examiner* — Roger Pang

(57) ABSTRACT

A drive conversion mechanism includes a rotatably mounted output shaft, a pair of output gears mounted on the output shaft so as to rotate independent of one another and relative to the output shaft and being displaced from each other axially along the output shaft, and a pair of one-way clutches arranged about the output shaft. Each clutch is connected to one of the output gears and extends about the output shaft in respective orientations that are the reverse of each other such that the one-way clutches can only drivingly engage the output shaft at alternate times, and thus not at the same time, so as to cause the output shaft to rotate in a same single direction as the output gears are driven in opposite directions relative to each other by an input train of constantly meshed input drive and idler gears.

15 Claims, 2 Drawing Sheets

DRIVE CONVERSION MECHANISM ENABLING CONSTANTLY MESHED GEARS IN A DRIVE INPUT GEAR TRAIN

CROSS REFERENCES TO RELATED APPLICATIONS

None.

BACKGROUND

1. Field of the Invention

The present invention relates generally to drive arrangements in machines, for instances inkjet printers and the like, and, more particularly, to a drive conversion mechanism for enabling constantly meshed gears in a drive input gear train.

2. Description of the Related Art

Consumer inkjet printers typically incorporate one or more drive arrangements which allow reversing of an input while maintaining a unidirectional output. This is done to achieve system efficiency and reduce part count within the machine. Such drive arrangements have been used predominately in sheet feeding pick mechanisms of these machines, but have applications in other areas as well. In a common embodiment, the drive arrangement includes an input gear train of meshed rotary input drive gear and idler gears, usually four, mounted on a plate which idler gears are allowed to rotate or pivot fractionally about the input drive gear of the gear train. There are two idler gears on one side of the pivot, the inner one of which is meshed with the input drive gear, and one idler gear on the other side of the pivot, also meshed with the input drive gear. However, only the outer one of the two idler gears on the one side of the pivot or the one idler gear on the other side of the pivot, but not both, can be meshed at one time with a rotary output gear. The plate can be rocked about the pivot to switch meshing with the output gear from the outer one of the two idler gears on the one side of the pivot to the one idler gear on the other side of the pivot, or vice versa. This drive arrangement of the input drive gear and idler gears and switching of the meshing of the respective idler gears with the output gear thus can convert rotary motion of the input drive gear in either direction to rotary motion of the output gear in only one direction because the two idler gears that can alternately mesh with the output gear are always being driven in the same one direction when they are meshed with the output gear.

By means of a frictional restriction anywhere in the gear train, the plate will rotate within its bounds in the direction of the rotation of the input drive gear. Positioning of the output gear such that it can be engaged by either of the outer idler gear or the other idler gear mounted on the plate, and allowing for clearance such that only one of these gears may be engaged or meshed at a time, will allow the plate to rock about its pivot into the engagement or mesh with the proper one of the idler gears coinciding with the direction of rotation of the input drive gear. While this type of drive arrangement is inexpensive, effective and widely used, it has drawbacks of lost motion and time to engage the output gear with the proper one of the idler gears when reversing the direction of the input drive gear.

Thus, a need still exists for an innovation that will provide greater efficiency in a drive arrangement which allows reversing of the direction of the input while maintaining the unidirectional output.

SUMMARY OF THE INVENTION

The present invention meets this need by providing an innovation in the form of a drive conversion mechanism that enables the provision of constantly meshed gears in the aforementioned input gear train for accommodating directional reversal of rotary input motion by the gear train as a unidirectional rotary output motion is produced by an output shaft of the drive conversion mechanism. The drive conversion mechanism enables the provision of constantly meshed gears in the input gear train, and thus the avoidance of lost motion and time of alternately meshing of gears, by incorporating a pair of clutches each connected to one of two output gears constantly meshed with the aforementioned gear train and arranged about an output shaft in reverse orientations such that the clutches can only drivingly engage the shaft at alternate times, and thus not at the same time, in response to the input gear train reversing its rotational direction, so that the output shaft produces rotary output motion in only a single direction. Thus, the output rotation is always in one direction with minimal lost motion and efficiency as the input rotation may vary between clockwise and counterclockwise rotation. The clutches may take the various forms, for example, a pair of wrap spring clutches which alternately are engaged on the shaft or slip relative thereto or a pair of ball clutches which alternately are engaged on the output shaft, to only transmit output rotation in the one direction.

Accordingly, in an aspect of the present invention, a drive conversion mechanism is provided for enabling constantly meshed gears in an input gear train. The drive conversion mechanism includes a rotatably-mounted shaft, a pair of gears mounted on the shaft so as to rotate independent of one another and relative to the shaft, and a pair of clutches arranged about the shaft. Each clutch is connected to one of the gears and extends about the shaft in respective orientations such that the clutches can only drivingly engage the shaft at alternate times so as to cause the shaft to rotate in a single direction even as the gears are driven in opposite directions relative to each other by their constant meshing with the input gear train of constantly meshed gears. Each clutch is a one-way clutch and, more particularly, may be a ball clutch adapted to engage on the shaft so as to transmit rotation in only the single direction. Alternatively, each clutch may be a wrap spring clutch adapted to grip on the shaft or slip relative thereto. The wrap spring clutches extend in opposite directions from the gears and in wrap orientations which are the reverse of one another along the shaft.

In another aspect of the present invention, a drive conversion mechanism interfaces with an input gear train of constantly meshed gears. The drive conversion mechanism includes a rotatably-mounted output shaft, a pair of output gears mounted on the output shaft so as to rotate independent of one another and relative to the output shaft, the output gears being separately constantly meshed with different oppositely rotating portions of the constantly meshed gears of the input gear train, and a pair of clutches arranged about the output shaft. Each clutch is connected to one of the pair of output gears and extends about the output shaft in respective orientations that are the reverse of each other such that the clutches can only drivingly engage the output shaft at alternate times so as to cause the output shaft to rotate in a single direction as the pair of output gears are driven in opposite directions. Each clutch is a one-way clutch and, more particularly, may be a ball clutch adapted to engage on the shaft so as to transmit rotation in only the single direction. Alternatively, each clutch may be a wrap spring clutch adapted to grip on the shaft or slip relative thereto. The wrap spring clutches extend in opposite directions from the gears and in wrap orientations which are the reverse of one another along the shaft.

In a further aspect of the present invention, a drive arrangement includes a drive input gear, a driven output shaft, and first and second gear trains located between and coupled with the drive input gear and the driven output shaft. The first gear train encompasses first and second idler gears and a first gear clutch assembly on the driven output shaft. The first gear clutch assembly includes a first output gear and a first one-way clutch. The first and second idler gears are located between and constantly meshed with the drive input gear and the first output gear of the first gear clutch assembly. The second gear train encompasses a third idler gear and a second gear clutch assembly on the driven output shaft. The second gear clutch assembly includes a second output gear and a second one-way clutch. The third idler gear is located between and constantly meshed with the drive input gear and the second output gear of the second gear clutch assembly. The first and second gear trains are operable to correspondingly drive the first and second gear clutch assemblies in opposite directions such that one of the first and second one-way clutches drivingly engages the output shaft while the other of the first and second does not drivingly engage the output shaft so that while the input rotation of the drive input gear reverses direction the output shaft will maintain a constant direction of rotation.

BRIEF DESCRIPTION OF THE DRAWINGS

Figure 1:
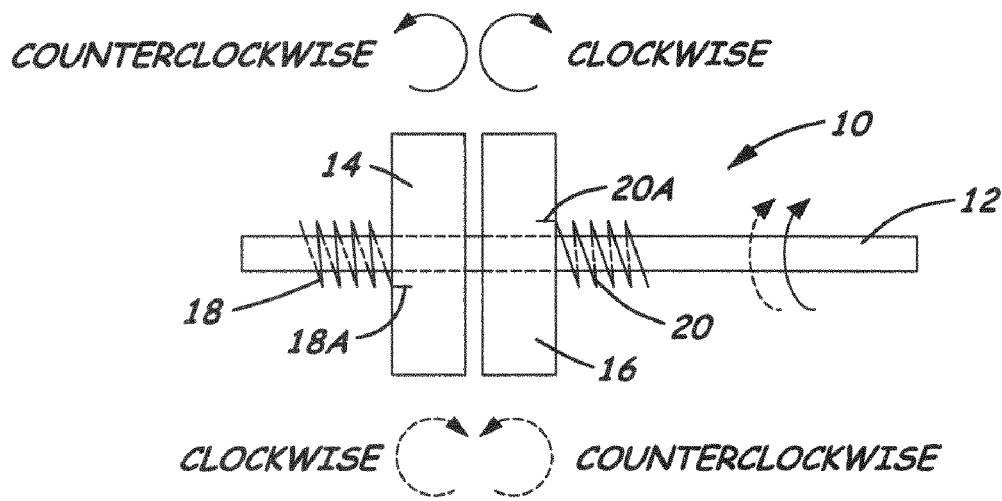

Having thus described the invention in general terms, reference will now be made to the accompanying drawings, which are not necessarily drawn to scale and in some instances portions may be exaggerated in order to emphasize features of the invention, and wherein:

FIG. 1 is a simplified diagram of a drive conversion mechanism in accordance with the present invention.

Figure 2:
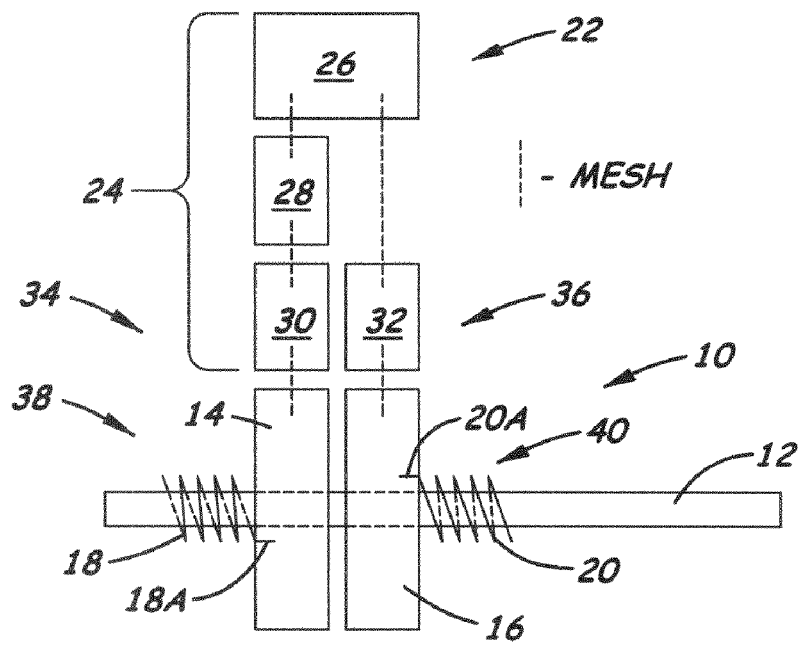

FIG. 2 is a simplified diagram of a drive arrangement which incorporates the drive conversion mechanism of FIG. 1 with an input gear train, the diagram also depicting the drive input gear and idler gears of the input gear train in an exploded form.

Figure 3:
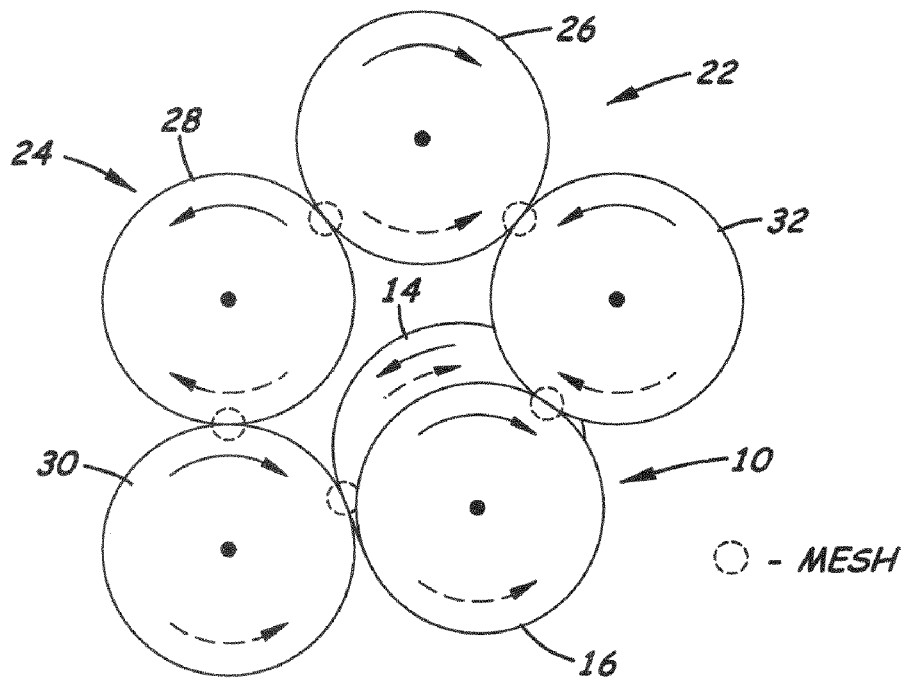

FIG. 3 is a simplified plan schematic representation of the drive arrangement of FIG. 2 showing meshing relationships between various ones of the gears.

Figure 4:
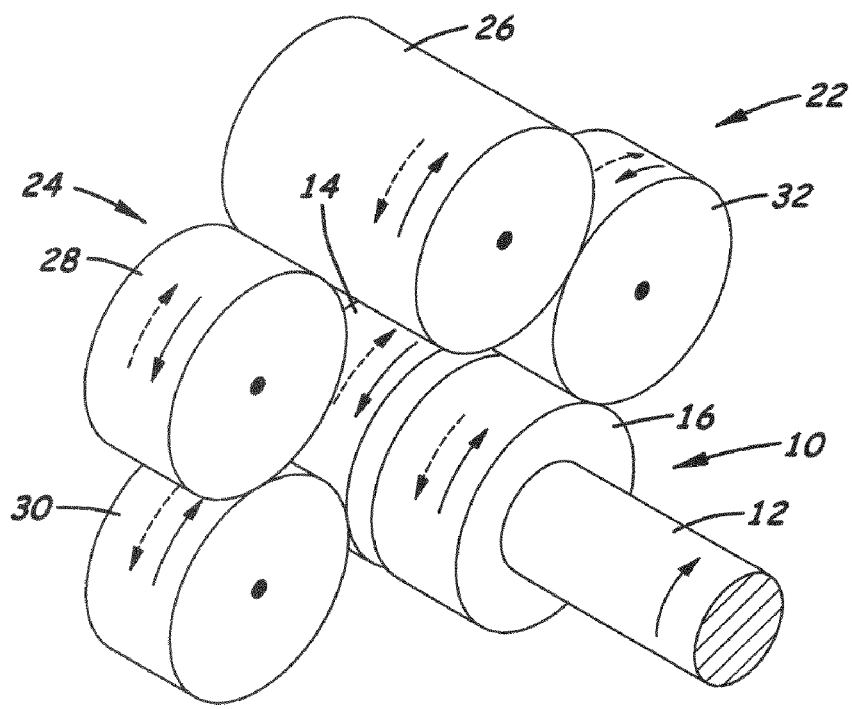

FIG. 4 is a simplified perspective diagram of the drive arrangement of FIG. 3.

DETAILED DESCRIPTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numerals refer to like elements throughout the views. Also, to reduce complexity of the drawings, actual teeth on the gears that are meshed are not shown.

Referring now to FIG. 1, there is illustrated a simplified diagram of a drive conversion mechanism, generally designated 10, in accordance with the present invention. The mechanism 10 includes an output shaft 12, first and second output gears 14, 16, and first and second one-way clutches 18, 20 which, by way of the illustrated example but not for purposes of limitation, may each be in the form of a wrap spring clutch. The clutches alternatively may each be ball clutches. Either type are well-known per se but not in the combination of the present invention. The output shaft 12 is mounted in any suitable manner for undergoing rotation. The first and second output gears 14, 16 are mounted in any suitable manner side-by-side on, and axially displaced along, the same output shaft 12 so as to rotate independent of one another and relative to the output shaft 12. The first and second wrap spring clutches 18, 20 are arranged about the output shaft 12 and correspondingly connected to the first and second output gears 14, 16 at 18A, 20A. Also, the first and second wrap spring clutches 18, 20 extend about the common output shaft 12 in opposite directions from the respective first and second output gears 14, 16 and are disposed in respective wrap orientations about the common output shaft 12 being the reverse of each other such that the first and second wrap spring clutches 18, 20 can grip the common output shaft 12 only at alternate times but will always rotatably drive the common output shaft 12 in the same direction. When the first and second wrap spring clutches 18, 20, at these alternate times, grip the output shaft 12 due to rotation of their respective first and second output gears 14, 16 in the clockwise direction, the output shaft 12 is driven and thus rotates in the clockwise direction. When the first and second wrap spring clutches 18, 20 release from and thus slip relative to the output shaft 12 due to rotation of the their respective first and second output gears 14, 16 in the counterclockwise direction, the output shaft 12 is not driven and thus does not rotate in the counterclockwise direction. If the respective wrap orientation of each of the first and second wrap spring clutches 18, 20 was reversed, driving of the output shaft 12 would cause its rotation in the counterclockwise direction when the first and second output gears 14, 16 are rotatably driven in the counterclockwise directions at alternate times.

Turning now to FIGS. 2-4, there is illustrated a simplified diagram of a drive arrangement, generally designated 22, also in accordance with the present invention which incorporates the drive conversion mechanism 10 of FIG. 1 together with a modified input gear train, generally designated 24. The modified input gear train 24, like in the prior art version, includes an input drive gear 26, first and second idler gears 28, 30 located to the left of the input drive gear 26 and the first and second output gears 14, 16, and a third idler gear 32 located to the right of the input drive gear 26 and the first and second output gears 14, 16. However, the modified input gear train 24, unlike in the prior art version, has all gears constantly meshed to at least one other gear. For instance, the input drive gear 26 is constantly meshed with the first and third idler gears 28, 32. The first idler gear 28 is constantly meshed also with the input drive gear 26 and the second idler gear 30. The second idler gear 30 is constantly meshed with the first idler gear 28 and the first output gear 14. The third idler gear 32 is constantly meshed with the input drive gear 26 and the second output gear 16. Furthermore, the input drive gear 28 has an axial length sufficient to span the combined axial lengths of the first and second output gears 14, 16 and the short length of space between them which allows axially offsetting of the third idler gear 32 from the aligned first and second idler gears 28, 30.

The incorporation of the drive conversion mechanism 10 allows for concurrent meshing in the aforementioned manner of the first, second and third idler gears 28, 30, 32 with both the input drive gear 26 and the first and second output driven gears 14, 16 and the maintenance of the constant single direction of the rotary output motion of the output shaft 12 while reversing of the direction of rotary input motion of the input drive gear 26. Thus, the drive conversion mechanism 10 of the present invention addresses the drawbacks of the prior art rocker type arrangement by reducing the lost motion and time to engage differing input directions. The drive conversion mechanism 10 and drive arrangement 22 employing the drive conversion mechanism 10 have minimal lost motion only in the degree of rotational engagement of the first and second wrap spring clutches 18, 20 and what little gear backlash exists. If the tolerances between the output shaft 12 and the wrap spring clutches 18, 20 can be maintained as desired, the drive conversion mechanism 10 provides an efficient way for transferring torque from the input drive gear 26 to the output shaft 12 while maintaining constant output rotational direction. Furthermore, the drive arrangement 22 has no toggle, and is more compact and constant in operation than the prior art rocker type arrangement.

As best seen in FIG. 2, the drive arrangement 22 also can be considered to be formed by the common drive input gear 26, the common driven output shaft 12, and separate first and second gear trains 34, 36. The first gear train 34 encompasses the first and second idler gears 28, 30 and a first gear clutch assembly 38, the latter including the first output gear 14 and the first wrap spring clutch 18. The second gear train 36 encompasses the third idler gear 32 and a second gear clutch assembly 40, the latter including the second output gear 16 and the second wrap spring clutch 20. Alternatively, the first and second gear clutch assemblies may incorporate ball clutches in place of the wrap spring clutches. Thus, the first and second gear trains 34, 36 drive their respective separate first and second gear clutch assemblies 38, 40 mounted to the common output shaft 12 in opposite directions. This is done so that one of the first and second wrap spring clutches 18, 20 is always locked onto the output shaft 12 while the other is slipping. This way when the input rotation reverses direction of the output shaft will maintain its constant direction of rotation.

It should be pointed out the gear clutch assembly 38 or 40, whether using a wrap spring clutch or a ball clutch, is per se well-known. It is the particular arrangement of the first and second gear clutch assemblies 38, 40 with the output shaft 12 to provide the drive conversion mechanism 10 that is not believed to be known in the prior art. The clutch is typically disposed in the interior of the gear.

The foregoing description of several embodiments of the invention has been presented for purposes of illustration. It is not intended to be exhaustive or to limit the invention to the precise forms disclosed, and obviously many modifications and variations are possible in light of the above teaching. It is intended that the scope of the invention be defined by the claims appended hereto.

What is claimed is:

1. A drive conversion mechanism for enabling constantly meshed gears in a drive input gear train, said drive conversion mechanism comprising:
   a rotatably-mounted shaft;
   a pair of gears mounted on said shaft so as to rotate independent of one another and relative to said shaft; and
   a pair of clutches arranged about said shaft, each clutch being connected to a different one of said gears and extending about said shaft in respective orientations such that said clutches only drivingly engage said shaft at alternate times so as to cause said shaft to rotate in a same single direction even as said gears are driven in opposite directions relative to each other;
   wherein said pair of gears are disposed in spaced apart and side-by-side relationship to one another on said shaft.

2. The mechanism of claim 1 wherein said pair of clutches are one-way clutches.

3. The mechanism of claim 1 wherein said pair of clutches are wrap spring clutches extending in opposite directions from said respective gears and in reverse wrap orientations about said shaft such that one of said wrap spring clutches drivingly grips on and slips relative to said shaft at alternate times from that of the other of said wrap spring clutches.

4. The mechanism of claim 1 wherein said pair of clutches are ball clutches reversely oriented on said shaft relative to one another.

5. A drive conversion mechanism interfaced with a drive input gear train of constantly meshed gears, said drive conversion mechanism, comprising:
   a rotatably-mounted output shaft;
   first and second output gears mounted on said output shaft so as to rotate independent of one another and relative to said output shaft and being displaced from each other axially along said output shaft, said first and second output gears being separately constantly meshed with different oppositely rotating portions of said constantly meshed gears of said drive input gear train; and
   first and second clutches arranged about said output shaft, each clutch being connected to a different one of said output gears and extending about said output shaft in respective orientations that are the reverse of each other such that said clutches do not drivingly engage said output shaft simultaneously, said clutches cause said output shaft to rotate in a same single direction as said output gears are driven in opposite directions.

6. The mechanism of claim 5 wherein said clutches are one-way clutches.

7. The mechanism of claim 6 wherein said clutches are wrap spring clutches extending in opposite directions from said respective gears and in reverse wrap orientations about said shaft such that one of said wrap spring clutches drivingly grips on and slips relative to said shaft at alternate times from that of the other of said wrap spring clutches.

8. The mechanism of claim 6 wherein said clutches are ball clutches reversely oriented on said shaft relative to one another.

9. The mechanism of claim 6 wherein said drive input gear train includes:
   an input drive gear;
   first and second idler gears located between said input drive gear and said first output gear such that said first idler gear constantly meshes with said second idler gear and said input drive gear and said second idler gear constantly meshes with said first idler gear and said first output gear; and
   a third idler gear located between said input drive gear and said second output gear such that said third idler gear constantly meshes with said input drive gear and said second output gear concurrently as said first and second idler gears constantly mesh with each other and with said input drive gear and said first output gear.

10. The mechanism of claim 9 wherein said input drive gear has an axial length sufficient to span combined axial lengths of said first and second output gears which allows axially offsetting of said third idler gear from said aligned first and second idler gears which are aligned with one another.

11. An imaging device, comprising:
   a media feed system including:
      a drive input gear;
      a driven output shaft; and
      first and second gear trains located between and coupled with said drive input gear and said driven output shaft; said first gear train encompassing first and second idler gears and a first gear clutch assembly on said driven output shaft, said first gear clutch assembly including a first output gear and a first one-way clutch, said first and second idler gears being located between and constantly meshed with said drive input gear and said first output gear of said first gear clutch assembly;

said second gear train encompassing a third idler gear and a second gear clutch assembly on said driven output shaft, said second gear clutch assembly including a second output gear and a second one-way clutch, said third idler gear being located between and constantly meshed with said drive input gear and said second output gear of said second gear clutch assembly;

said first and second gear trains being operable to correspondingly drive said first and second gear clutch assemblies in opposite directions such that one of said first and second one-way clutches drivingly engages said output shaft while the other of said first and second one-way clutches does not drivingly engage said output shaft so that while the input rotation of said drive input gear reverses direction said output shaft will maintain a constant direction of rotation.

12. The imaging device of claim 11 wherein said first and second output gears are mounted on said output shaft so as to rotate independent of one another and relative to said output shaft and being displaced from each other axially along said output shaft.

13. The imaging device of claim 12 wherein each of said first and second one-way clutches is connected to corresponding ones of said first and second output gears and extends about said output shaft in respective orientations that are the reverse of each other such that said clutches only drivingly engage said output shaft at alternate times so as to cause said output shaft to rotate in the constant direction of rotation as said drive input gear reverses direction and said first and second output gears are driven in opposite directions.

14. The imaging device of claim 11 wherein said one-way clutches are wrap spring clutches extending in opposite directions from said respective gears and in reverse wrap orientations about said shaft such that one of said wrap spring clutches drivingly grips on and slips relative to said shaft at alternate times from that of the other of said wrap spring clutches.

15. The imaging device of claim 11 wherein said media feed system further comprises a roll member coupled to said driven output shaft and an index roll coupled to the drive input gear, wherein the index roll is rotated in a first direction to deskew a media sheet during a print operation and then in a second direction to move the media sheet towards a print zone of the imaging device, and the roll member rotates in one direction responsive to motion of the index roll and the drive input gear.

\* \* \* \* \*